US011055017B1

(12) United States Patent
Ward et al.

(10) Patent No.: US 11,055,017 B1
(45) Date of Patent: Jul. 6, 2021

(54) THROTTLING A POINT-IN-TIME SNAPSHOT COPY OPERATION WITHIN A DATA CONSISTENCY APPLICATION

(71) Applicant: International Business Machines Corporation, Armonk, NY (US)

(72) Inventors: Matthew J. Ward, Vail, AZ (US); Theresa Mary Brown, Tucson, AZ (US); Nedlaya Yazzie Francisco, Tucson, AZ (US); Gail Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/773,620

(22) Filed: Jan. 27, 2020

(51) Int. Cl.
*G06F 12/00* (2006.01)
*G06F 3/06* (2006.01)
*G06F 11/14* (2006.01)

(52) U.S. Cl.
CPC .............. *G06F 3/065* (2013.01); *G06F 3/067* (2013.01); *G06F 3/0619* (2013.01); *G06F 3/0653* (2013.01); *G06F 3/0659* (2013.01); *G06F 3/0665* (2013.01); *G06F 11/1451* (2013.01);
(Continued)

(58) Field of Classification Search
CPC ...... G06F 3/065; G06F 3/0619; G06F 3/0653; G06F 3/0659; G06F 3/0665; G06F 3/067; G06F 11/1451; G06F 11/1461; G06F 11/1464; G06F 2201/84
See application file for complete search history.

(56) References Cited

U.S. PATENT DOCUMENTS

| | | | |
|---|---|---|---|
| 6,910,098 B2 | 6/2005 | LeCrone et al. | |
| 7,051,052 B1* | 5/2006 | Shapiro | G06F 11/2071 |
| | | | 707/610 |
| 7,523,148 B2 | 4/2009 | Suzuki et al. | |

(Continued)

FOREIGN PATENT DOCUMENTS

| | | | |
|---|---|---|---|
| EP | 1426863 A2 | 6/2004 | |
| EP | 1845449 A2 | 10/2007 | |

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

(Continued)

*Primary Examiner* — John A Lane
(74) *Attorney, Agent, or Firm* — Zilka-Kotab, P.C.

(57) ABSTRACT

A computer-implemented method according to one embodiment includes determining that a consistency group has not been created within a predetermined period of time; sending a request to create the consistency group, where the request includes an indication that a creation of the consistency group is mandatory; identifying one or more logical storage volumes associated with the request to create the consistency group; marking each of the identified one or more logical storage volumes to indicate that a point-in-time snapshot copy operation is not allowed for the one or more logical storage volumes; creating the consistency group; sending the consistency group from a source site to a destination site; and removing the marking from each of the identified one or more logical storage volumes to indicate that a point-in-time snapshot copy operation is allowed for the one or more logical storage volumes.

20 Claims, 8 Drawing Sheets

(52) U.S. Cl.
CPC ...... *G06F 11/1461* (2013.01); *G06F 11/1464* (2013.01); *G06F 2201/84* (2013.01)

(56) References Cited

U.S. PATENT DOCUMENTS

| | | | |
|---|---|---|---|
| 7,945,750 | B2 | 5/2011 | Arakawa et al. |
| 9,280,296 | B2 | 3/2016 | Crawford et al. |
| 9,471,799 | B2 | 10/2016 | Schiffman et al. |
| 9,934,172 | B1 | 4/2018 | Koli et al. |
| 9,959,063 | B1 | 5/2018 | Meiri et al. |
| 10,001,933 | B1 * | 6/2018 | Johnson ............... G06F 13/382 |
| 10,180,951 | B2 | 1/2019 | Gupta et al. |
| 10,313,243 | B2 | 6/2019 | Thanasekaran |
| 2005/0240928 | A1 | 10/2005 | Brown et al. |
| 2012/0078848 | A1 * | 3/2012 | Jennas, II ........... G06F 16/1844 707/649 |
| 2014/0279900 | A1 | 9/2014 | Gupta et al. |
| 2014/0372394 | A1 * | 12/2014 | Frankel ................ G06F 16/128 707/703 |
| 2016/0248676 | A1 | 8/2016 | Thanasekaran |
| 2018/0322017 | A1 | 11/2018 | Maccanti et al. |
| 2019/0155696 | A1 | 5/2019 | Gill et al. |
| 2019/0212925 | A1 | 7/2019 | Ward et al. |
| 2019/0238462 | A1 | 8/2019 | Thanasekaran |
| 2019/0332499 | A1 * | 10/2019 | Huang .................. G06F 3/0659 |
| 2020/0301784 | A1 * | 9/2020 | Chen ...................... G06F 3/065 |
| 2020/0401315 | A1 * | 12/2020 | Chen ..................... G06F 3/0604 |

OTHER PUBLICATIONS

Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.
Hitachi, "Hitachi Virtual Storage Platform: Hitachi TrueCopy User Guide," Hitachi Data Systems, 2014, 200 pages.
Statement Regarding Prior Disclosures by Another Who Obtained the Subject Matter from an Inventor or Joint Inventor, Jan. 27, 2020, 1 page.
IBM, "Global Mirror," IBM Knowlegde Center, retrieved on Jan. 27, 2020, from https://www.ibm.com/support/knowledgecenter/ST5GLJ_8.5.3/com.ibm.storage.ssic.help.doc/f2c_asyncpprc_1mis3u.html, 4 pages.

* cited by examiner

THROTTLING A POINT-IN-TIME SNAPSHOT COPY OPERATION WITHIN A DATA CONSISTENCY APPLICATION

BACKGROUND

The present invention relates to data replication, and more particularly, this invention relates to throttling a point-in-time snapshot copy operation within a data replication environment.

Data replication is a popular way of securing important data to provide protection against system outages. Performing a point-in-time snapshot copy of data also preserves a current state of data within a system. However, performing a point-in-time snapshot copy of data within a data replication environment affects a consistent asynchronous replication application. Further, too many consecutive point-in-time snapshot copies may affect a recovery point objective (RPO) of a system.

BRIEF SUMMARY

A computer-implemented method according to one embodiment includes determining, by a master process, that a consistency group has not been created by a data consistency application within a predetermined period of time; sending, by the master process to a subordinate process, a request to create the consistency group, where the request includes an indication that a creation of the consistency group is mandatory; identifying, by the subordinate process, one or more logical storage volumes associated with the request to create the consistency group; marking, by the subordinate process, each of the identified one or more logical storage volumes to indicate that a point-in-time snapshot copy operation is not allowed for the one or more logical storage volumes; creating, by the subordinate process, the consistency group; sending, by the subordinate process, the consistency group from a source site to a destination site; and removing, by the subordinate process, the marking from each of the identified one or more logical storage volumes to indicate that a point-in-time snapshot copy operation is allowed for the one or more logical storage volumes.

According to another embodiment, a computer program product for throttling a point-in-time snapshot copy operation within a data consistency application includes a computer readable storage medium having program instructions embodied therewith, where the computer readable storage medium is not a transitory signal per se, and where the program instructions are executable by a processor to cause the processor to perform a method including determining, by a master process utilizing the processor, that a consistency group has not been created by a data consistency application within a predetermined period of time; sending, by the master process to a subordinate process utilizing the processor, a request to create the consistency group, where the request includes an indication that a creation of the consistency group is mandatory; identifying, by the subordinate process utilizing the processor, one or more logical storage volumes associated with the request to create the consistency group; marking, by the subordinate process utilizing the processor, each of the identified one or more logical storage volumes to indicate that a point-in-time snapshot copy operation is not allowed for the one or more logical storage volumes; creating, by the subordinate process utilizing the processor, the consistency group; sending, by the subordinate process utilizing the processor, the consistency group from a source site to a destination site; and removing, by the subordinate process utilizing the processor, the marking from each of the identified one or more logical storage volumes to indicate that a point-in-time snapshot copy operation is allowed for the one or more logical storage volumes.

According to another embodiment, a system includes a processor; and logic integrated with the processor, executable by the processor, or integrated with and executable by the processor, where the logic is configured to determine, by a master process, that a consistency group has not been created by a data consistency application within a predetermined period of time; send, by the master process to a subordinate process, a request to create the consistency group, where the request includes an indication that a creation of the consistency group is mandatory; identify, by the subordinate process, one or more logical storage volumes associated with the request to create the consistency group; mark, by the subordinate process, each of the identified one or more logical storage volumes to indicate that a point-in-time snapshot copy operation is not allowed for the one or more logical storage volumes; create, by the subordinate process, the consistency group; send, by the subordinate process, the consistency group from a source site to a destination site; and remove, by the subordinate process, the marking from each of the identified one or more logical storage volumes to indicate that a point-in-time snapshot copy operation is allowed for the one or more logical storage volumes.

Other aspects and embodiments of the present invention will become apparent from the following detailed description, which, when taken in conjunction with the drawings, illustrate by way of example the principles of the invention.

DETAILED DESCRIPTION

Figure 1:
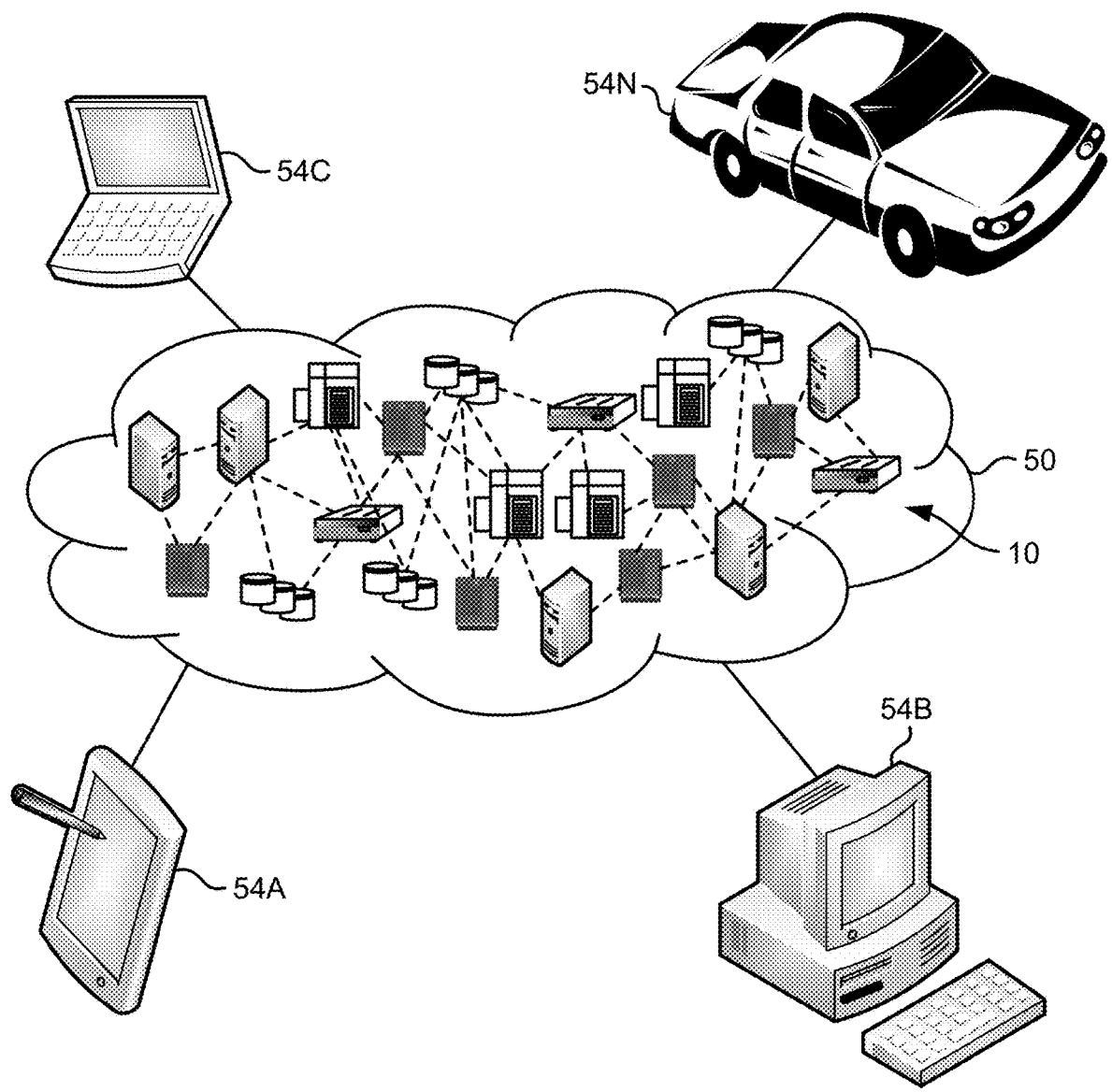
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of throttling a point-in-time snapshot copy operation within a data consistency application.

In one general embodiment, a computer-implemented method includes determining, by a master process, that a consistency group has not been created by a data consistency application within a predetermined period of time; sending, by the master process to a subordinate process, a request to create the consistency group, where the request includes an indication that a creation of the consistency group is mandatory; identifying, by the subordinate process, one or more logical storage volumes associated with the request to create the consistency group; marking, by the subordinate process, each of the identified one or more logical storage volumes to indicate that a point-in-time snapshot copy operation is not allowed for the one or more logical storage volumes; creating, by the subordinate process, the consistency group; sending, by the subordinate process, the consistency group from a source site to a destination site; and removing, by the subordinate process, the marking from each of the identified one or more logical storage volumes to indicate that a point-in-time snapshot copy operation is allowed for the one or more logical storage volumes.

In another general embodiment, a computer program product for throttling a point-in-time snapshot copy operation within a data consistency application includes a computer readable storage medium having program instructions embodied therewith, where the computer readable storage medium is not a transitory signal per se, and where the program instructions are executable by a processor to cause the processor to perform a method including determining, by a master process utilizing the processor, that a consistency group has not been created by a data consistency application within a predetermined period of time; sending, by the master process to a subordinate process utilizing the processor, a request to create the consistency group, where the request includes an indication that a creation of the consistency group is mandatory; identifying, by the subordinate process utilizing the processor, one or more logical storage volumes associated with the request to create the consistency group; marking, by the subordinate process utilizing the processor, each of the identified one or more logical storage volumes to indicate that a point-in-time snapshot copy operation is not allowed for the one or more logical storage volumes; creating, by the subordinate process utilizing the processor, the consistency group; sending, by the subordinate process utilizing the processor, the consistency group from a source site to a destination site; and removing, by the subordinate process utilizing the processor, the marking from each of the identified one or more logical storage volumes to indicate that a point-in-time snapshot copy operation is allowed for the one or more logical storage volumes.

In another general embodiment, a system includes a processor; and logic integrated with the processor, executable by the processor, or integrated with and executable by the processor, where the logic is configured to determine, by a master process, that a consistency group has not been created by a data consistency application within a predetermined period of time; send, by the master process to a subordinate process, a request to create the consistency group, where the request includes an indication that a creation of the consistency group is mandatory; identify, by the subordinate process, one or more logical storage volumes associated with the request to create the consistency group; mark, by the subordinate process, each of the identified one or more logical storage volumes to indicate that a point-in-time snapshot copy operation is not allowed for the one or more logical storage volumes; create, by the subordinate process, the consistency group; send, by the subordinate process, the consistency group from a source site to a destination site; and remove, by the subordinate process, the marking from each of the identified one or more logical storage volumes to indicate that a point-in-time snapshot copy operation is allowed for the one or more logical storage volumes.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
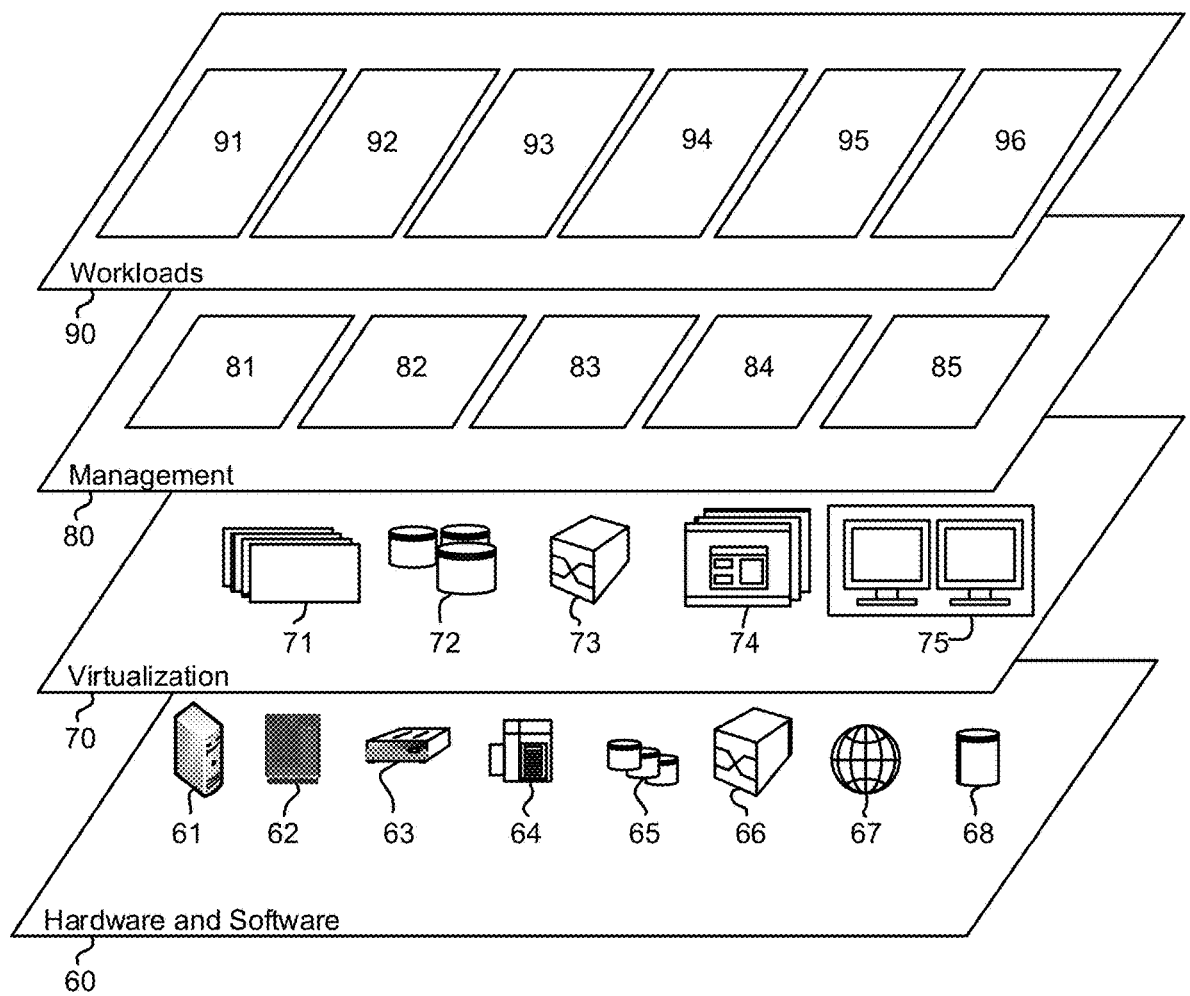
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data consistency implementation 96.

Figure 3:
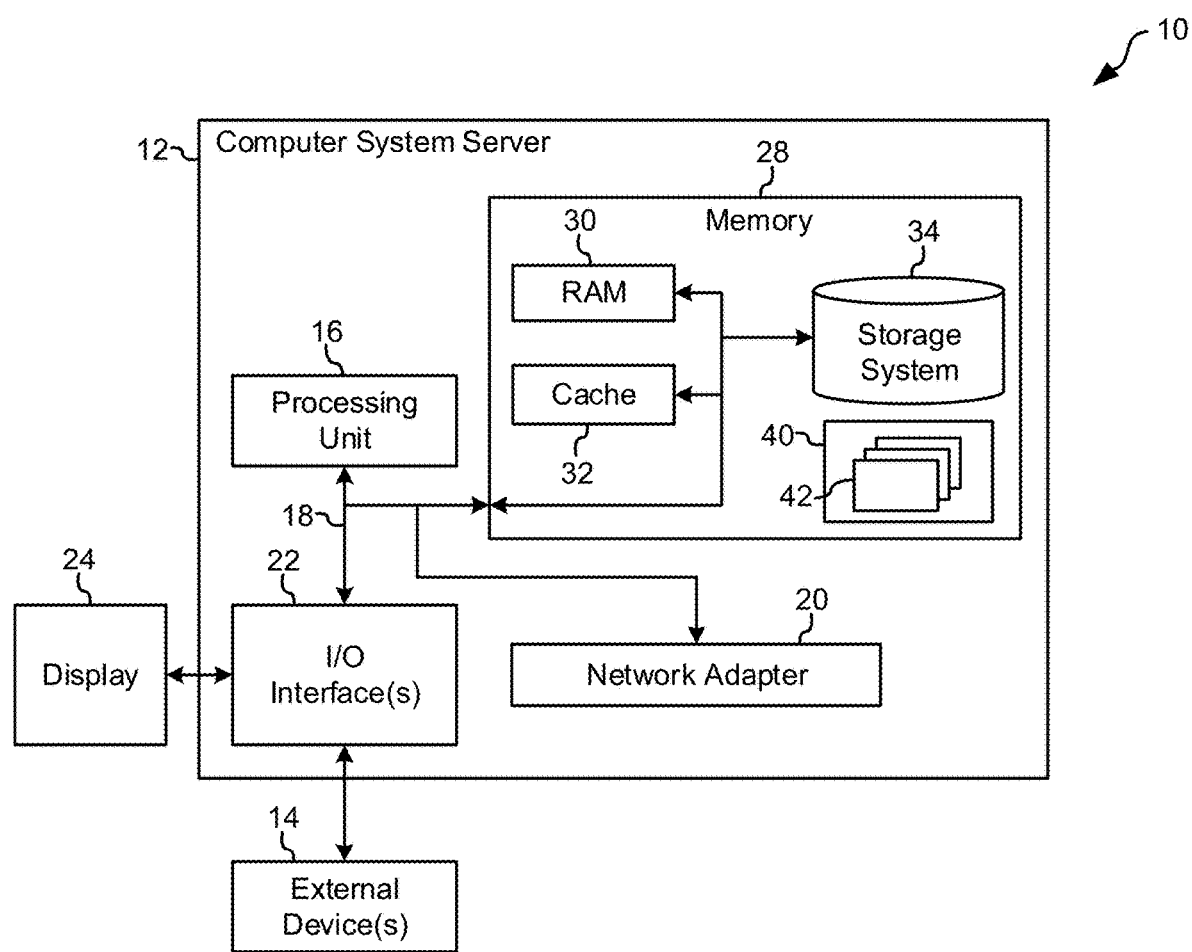
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
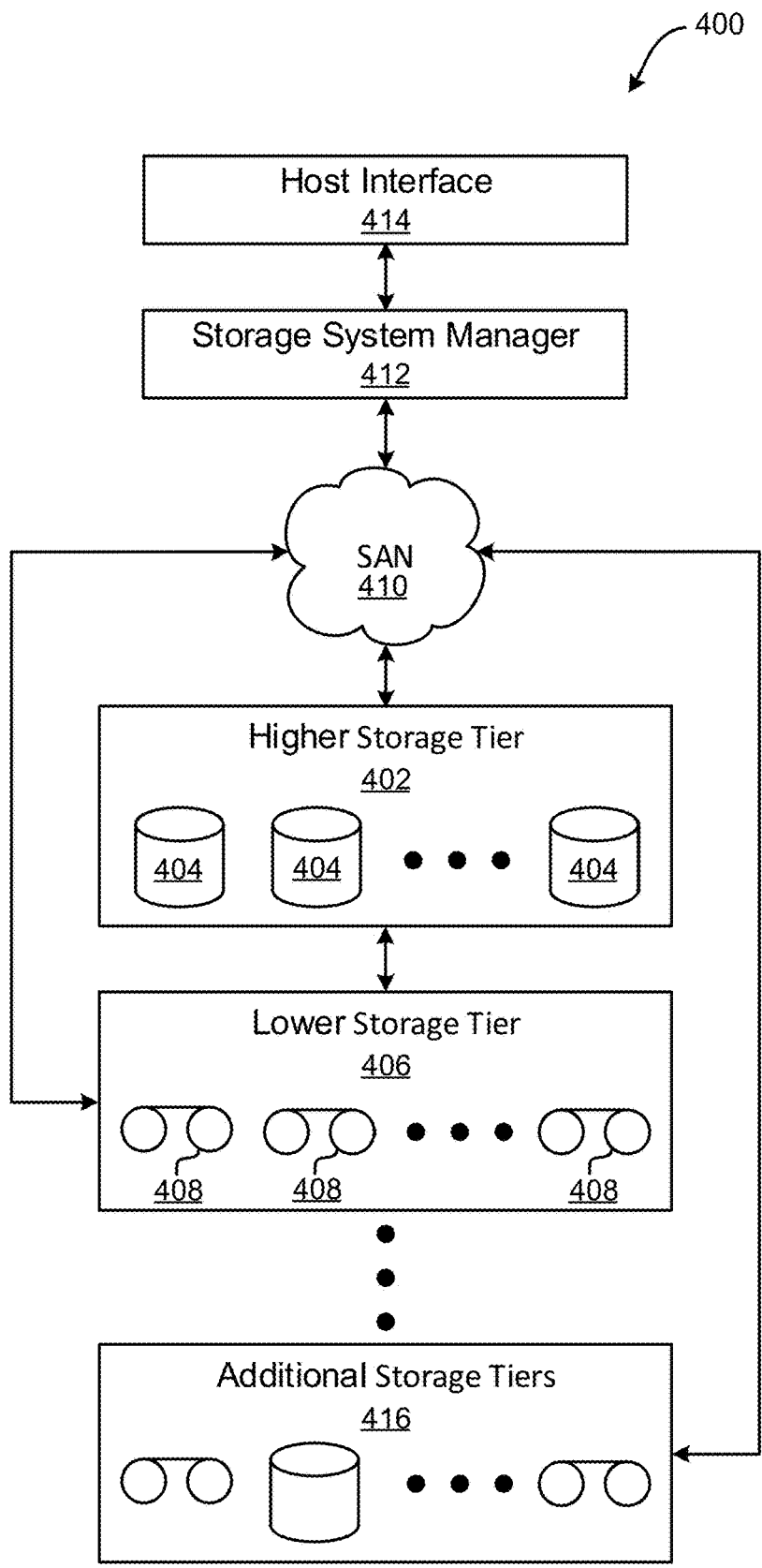
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
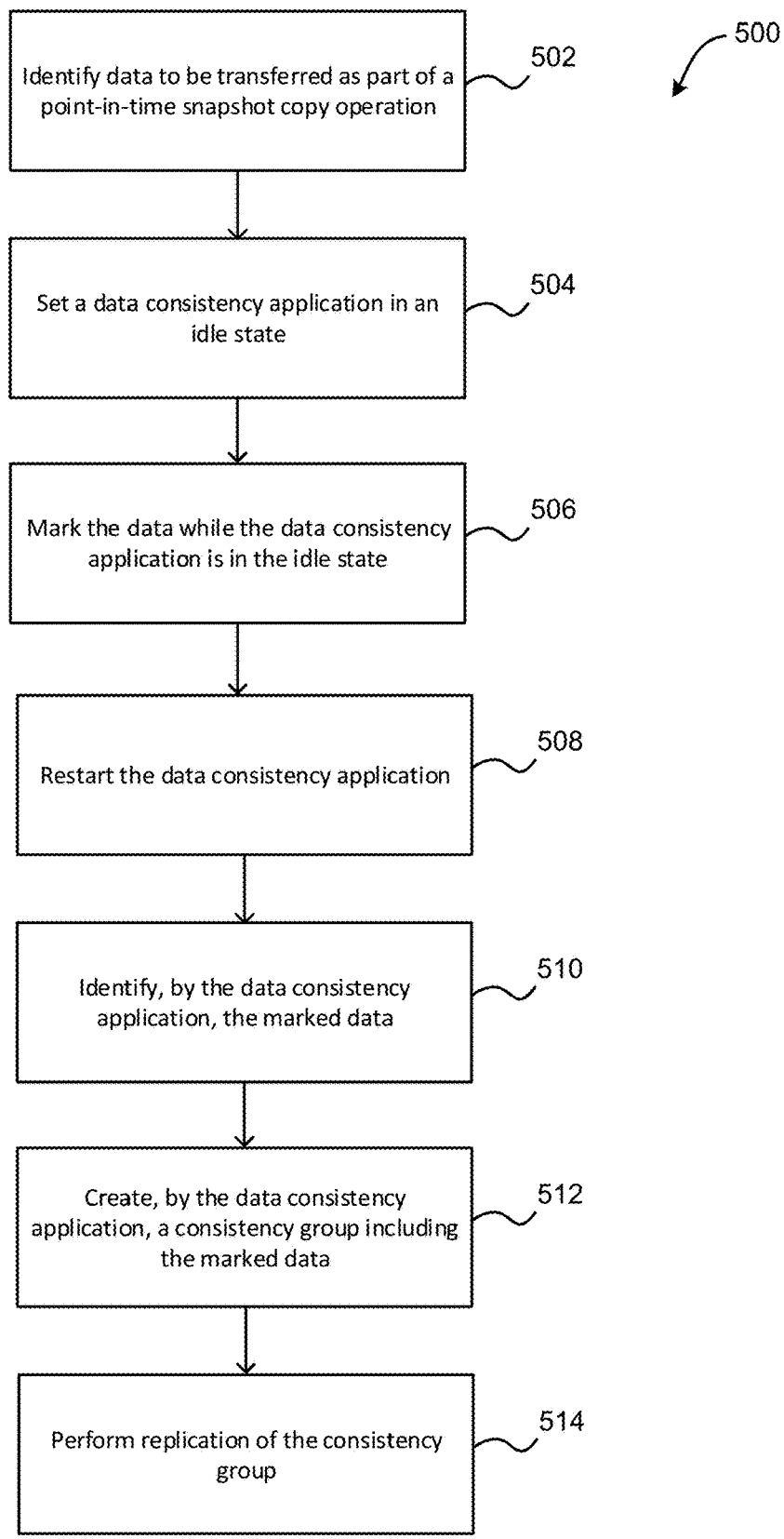
FIG. 5 illustrates a flowchart of a method for performing a point-in-time snapshot copy operation within a data consistency application, in accordance with one embodiment of the present invention.

Now referring to FIG. 5, a flowchart of a method 500 for performing a point-in-time snapshot copy operation within a data consistency application is shown according to one embodiment. The method 500 may be performed in accordance with the present invention in any of the environments depicted in FIGS. 1-4 and 8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where data to be transferred as part of a point-in-time snapshot copy operation is identified. In one embodiment, the point-in-time snapshot copy operation may include the transfer of a point-in-time copy of the data from a first logical storage volume (e.g., a source volume) to a second logical storage volume (e.g., a target volume). For example, in response to one or more changes made to data within a source volume, specific portions of the data affected by the changes may be identified. In another example, the specific portions of the data may be included within the data to be transferred as part of the point-in-time snapshot copy operation.

Additionally, in one embodiment, the point-in-time snapshot copy operation may include an IBM® FlashCopy operation. In another embodiment, a logical storage volume may include virtualized representation of physical storage from one or more physical storage volumes. For example, the first logical storage volume may represent first physical storage located at a first site (e.g., physical storage environment location).

Further, in one embodiment, the first site may include a plurality of logical partitions (LPARs). For example, each LPAR may include computing hardware (e.g., one or more processors, etc.). In another example, each LPAR may include storage hardware (e.g., physical storage drives such as hard disk drives, flash drives, tape drives, etc.). In yet another example, the storage hardware may provide the physical storage resources for the logical storage volume. In still another example, an exemplary LPAR may include an IBM® DS8000® series server.

Further still, in one embodiment, the second logical storage volume may represent second physical storage located at a second site separate from the first site. In another embodiment, the data may include one or more tracks of a logical storage volume, an entire logical storage volume, a predetermined data set, etc.

Also, method 500 may proceed with operation 504, where a data consistency application is set in an idle state. In one embodiment, a global copy application may perform asynchronous data replication between a first logical storage volume (e.g., a source volume) located at a first site and a second logical storage volume (e.g., a target volume) located at a second site. In another embodiment, the asynchronous data replication may include identifying changes made to data at a first site, and implementing those changes to data at a second site.

In addition, in one embodiment, the asynchronous data replication may be performed to create a backup volume to protect against hardware failure, malware, etc. In another embodiment, the data consistency application may maintain data consistency during asynchronous data replication by ensuring a predetermined order of data being replicated. For example, the global copy application may not guarantee consistency (e.g., an order in which the data is being sent during asynchronous data replication).

Furthermore, in one embodiment, the data consistency application may include an instance of IBM® Global Mirror. In another embodiment, the data consistency application may have two states. For example, a first state of the data consistency application may include an active state in which the data consistency application is currently forming a consistency group (e.g., a group of data to be sent during data replication). In another example, a second state of the data consistency application may include an idle state in which the data consistency application does not form a consistency group.

Further still, in one embodiment, the data consistency application may be set in an idle state by sending one or more commands to the data consistency application (e.g., an idle state initiation command, etc.). In another embodiment, by setting the data consistency application in the idle state, the data consistency application may be temporarily prevented from creating a consistency group.

Also, method 500 may proceed with operation 506, where the data is marked while the data consistency application is in the idle state. In one embodiment, the data may be marked as data to be replicated during asynchronous data replication. In another embodiment, the data may be marked by setting an out of sync bit map for a global copy relationship for the data. In yet another embodiment, the data consistency application may be maintained in the idle state while the data is marked (e.g., by periodically sending one or more idle commands, etc.).

Additionally, method 500 may proceed with operation 508, where the data consistency application is restarted. In one embodiment, the data consistency application may be restarted by changing the state of the data consistency application. In another embodiment, the data consistency application may be set in an active state by sending one or more commands to the data consistency application (e.g., an active state initiation command, etc.).

Further, method 500 may proceed with operation 510, where the marked data is identified by the data consistency application. In one embodiment, while in the active state, the data consistency application may identify the out of sync bit map for a global copy relationship set for the data. In another embodiment, in response to the identification, the data consistency application may identify the marked data as data located at a first site that is not synchronized with a second site.

Further still, method 500 may proceed with operation 512, where a consistency group including the marked data is created by the data consistency application. In one embodiment, in response to the identification of the marked data, the data consistency application may create a data consistency group that includes the marked data. In another embodiment, the data consistency application may create a data consistency group in response to a request received from a master process at a subordinate process.

Also, in one embodiment, the data consistency group may include data in addition to the data to be transferred as part of a point-in-time snapshot copy operation. In another embodiment, creating the consistency group may include tagging the marked data (e.g., using one or more flags) as data to be synchronized with a second site. In yet another embodiment, the consistency group may be created by a subordinate process within one or more servers of the first site.

In addition, method 500 may proceed with operation 514, where replication of the consistency group is performed. In one embodiment, performing replication of the consistency group may include sending data within the consistency group from a first site to a second site for integration at the second site. For example, the marked data within the consistency group may be sent from a first site (where changes were made to data within a source volume of the first site) to replace corresponding data at a second site (where a target volume of the second site stores a mirrored copy of all data within the source volume of the first site).

In this way, a point-in-time snapshot copy operation may be performed while maintaining data consistency between the first site and the second site during data replication. As a result, data at the second site may be used to restore data at the first site in response to one or more events (e.g., hardware or software failure at the first site, malware at the first site, etc.). This may protect data stored within the first site, and may improve a performance of hardware at the first site in response to one or more failures.

Figure 6:
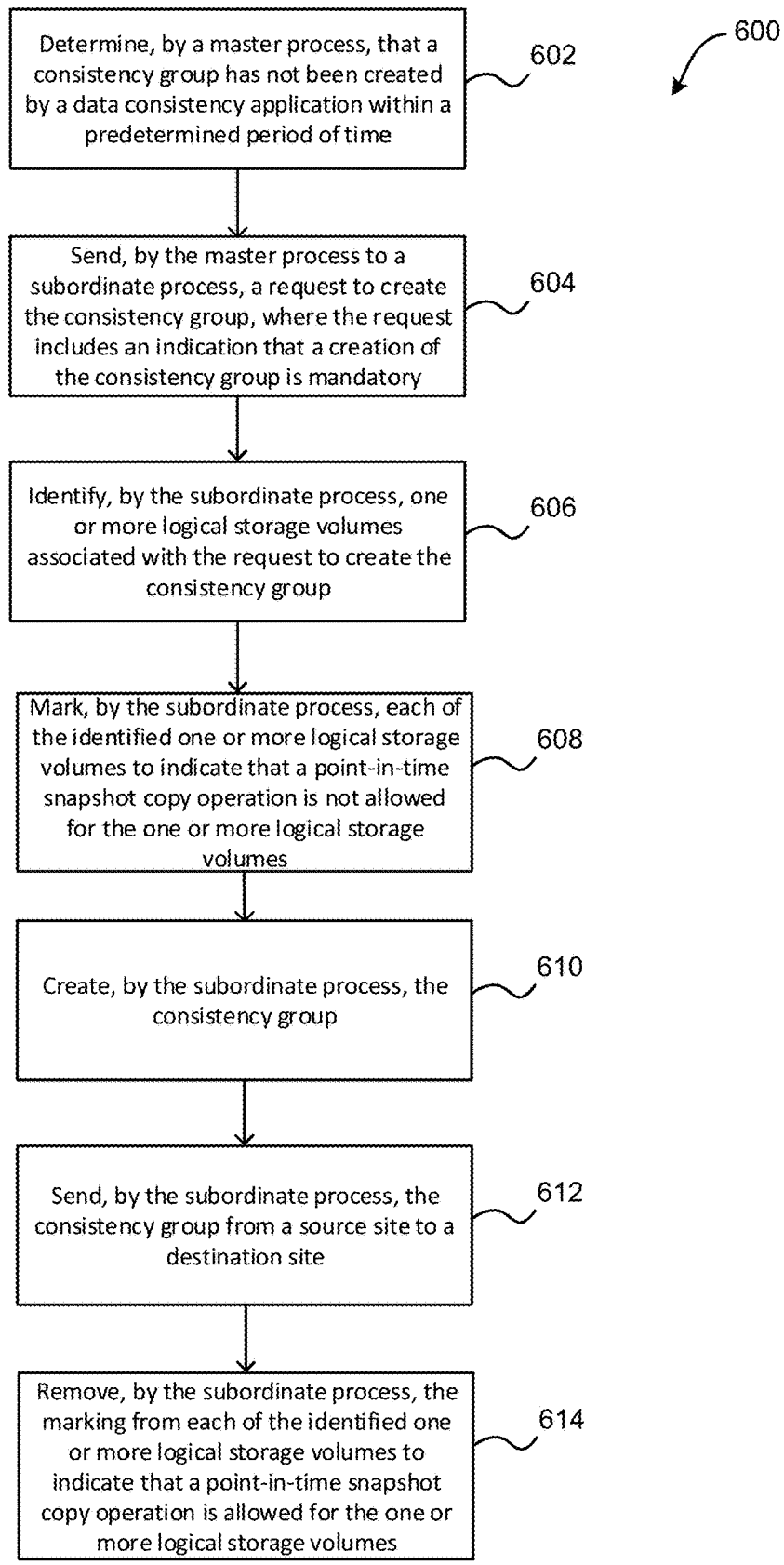
FIG. 6 illustrates a flowchart of a method for throttling a point-in-time snapshot copy operation within a data consistency application, in accordance with one embodiment of the present invention.

Now referring to FIG. 6, a flowchart of a method 600 is shown according to one embodiment. The method 600 may be performed in accordance with the present invention in any of the environments depicted in FIGS. 1-4 and 8, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a master process determines that a consistency group has not been created by a data consistency application within a predetermined period of time. In one embodiment, the master process may include an application running on a server (e.g., a logical partition (LPAR), etc.). In another embodiment, the server may be one of a plurality of servers located at a first site (e.g., a source site, etc.).

Additionally, in one embodiment, the data consistency application may maintain data consistency during asynchronous data replication from the first site to a second site (e.g., from a source site to a destination site). In another embodiment, the data consistency application may maintain data consistency by ensuring a predetermined order of data being replicated during the asynchronous data replication. In yet another embodiment, the consistency group may include a group of data to be sent during data replication from the first site to the second site.

Further, in one embodiment, the data consistency application may include an instance of IBM® Global Mirror. In another embodiment, the master process may be implemented within the data consistency application. In yet another embodiment, the master process may include a Global Mirror master.

Further still, in one embodiment, the master process may coordinate the creation of consistency groups within the first site. For example, the master process may reside on one of a plurality of servers within the first site, and may instruct each of the plurality of servers to create and send consistency groups as part of the data consistency application. In another embodiment, the master process may start a timer after a consistency group has been created and sent from the first site.

Also, in one embodiment, the master process may compare a current elapsed time indicated by the timer to the predetermined period of time. For example, the predetermined period of time may be set by one or more users, may be dynamically determined based on historical pattern analysis, etc. In another embodiment, it may be determined that the consistency group has not been created by the data consistency application within the predetermined period of time in response to determining that the current elapsed time exceeds the predetermined period of time.

In addition, method 600 may proceed with operation 604, where the master process sends a request to create the consistency group to a subordinate process, where the request includes an indication that a creation of the consistency group is mandatory. In one embodiment, the request to create the consistency group may be sent by the master process in response to determining that the consistency group has not been created by the data consistency application within the predetermined period of time.

Furthermore, in one embodiment, the request to create the consistency group may be sent by the master process in response to a predetermined schedule. In another embodiment, the subordinate process may include an application running on the same server as the master process. In yet another embodiment, the subordinate process may include an application running on a different server from the master process.

Further still, in one embodiment, the subordinate process may control one or more logical storage volumes that contain data within the consistency group. In another embodiment, the request to create the consistency group may be sent by the master process to a plurality of subordinate processes running on a plurality of servers within the first site. For example, each of the plurality of servers within the first site may have a subordinate process running on the server.

Also, in one embodiment, the indication that the creation of the consistency group is mandatory may include a flag that is set within the request. For example, the flag may indicate a request for a forced creation of the consistency group. In another embodiment, the request may include a start increment command used to create the consistency group within the servers of the first site.

Additionally, method 600 may proceed with operation 606, where the subordinate process identifies one or more logical storage volumes associated with the request to create the consistency group. In one embodiment, the subordinate process may receive the request to create the consistency group from the master process. In another embodiment, the subordinate process may identify the indication that the creation of the consistency group is mandatory from within the request. For example, when creation of a consistency group is mandatory, the consistency group is not constrained to complete within a designated time, and interruption from point-in-time copies are prevented. In another example, the subordinate process may identify the flag indicating that the request is a request for a forced creation of the consistency group.

Further, in one embodiment, the data consistency application may identify all data located at its associated server that is not synchronized with a second site. For example, all data consistency applications may identify all data located at the source site that is not synchronized with the second site. In another embodiment, data located at an associated server that is not synchronized with a second site may include data that has been altered since a last synchronization even has occurred between the first site and the second site.

Further still, in one embodiment, the data consistency application may identify all out of sync bits in an out of sync bit map for a global copy relationship set for the data within the associated server. In another embodiment, the data consistency application may identify the one or more logical storage volumes that contain the data that is not synchronized with the second site. For example, these identified logical storage volumes may comprise the one or more logical storage volumes associated with the request to create the consistency group.

Also, method 600 may proceed with operation 608, where the subordinate process marks each of the identified one or more logical storage volumes to indicate that a point-in-time snapshot copy operation is not allowed for the one or more logical storage volumes. In one embodiment, each of the identified logical storage volumes may be marked before a start of a creation of the consistency group by the subordinate process. In another embodiment, each of the identified logical storage volumes may be marked by the subordinate process setting a flag for the logical storage volume, where the flag indicates that a point-in-time snapshot copy operation is not currently allowed for the logical storage volume.

In addition, method 600 may proceed with operation 610, where the subordinate process creates the consistency group. In one embodiment, creating the consistency group may include identifying marked data within the server as data located at the first site that is not synchronized with the second site. In another embodiment, creating the consistency group may include tagging the marked data (e.g., using one or more flags) as data to be synchronized with the second site.

Furthermore, method 600 may proceed with operation 612, where the subordinate process sends the consistency group from a source site to a destination site. In one embodiment, the consistency group may include all data located at the server that is not synchronized with the second site. In another embodiment, the data within the consistency group may be sent from the first site (e.g., the source site) to a second site (e.g., the destination site) for integration at the second site, as part of a replication operation.

Further still, method 600 may proceed with operation 614, where the subordinate process removes the marking from each of the identified one or more logical storage volumes to indicate that a point-in-time snapshot copy operation is allowed for the one or more logical storage volumes. In one embodiment, the marking may be removed from the identified one or more logical storage volumes in response to a completion of a transfer of the consistency group from the source site to the destination site. In another embodiment, removing the marking may include resetting the flag for each of the one or more logical storage volumes.

In this way, point-in-time snapshot copy operations may be prevented from interrupting the creation and transfer of the consistency group. This may ensure that consistency groups are created and sent on a regular basis (e.g., at least once during a predetermined period of time). This in turn may keep a recovery point objective (RPO) from exceeding a predetermined point, which may minimize an amount of data that is lost in response to one or more events at the first site (e.g., hardware or software failure at the first site, malware at the first site, etc.). For example, data at the second site may be used to restore data at the first site in response to the one or more events at the first site. This may protect data stored within the first site, and may improve a performance of hardware at the first site in response to one or more failures.

Figure 7:
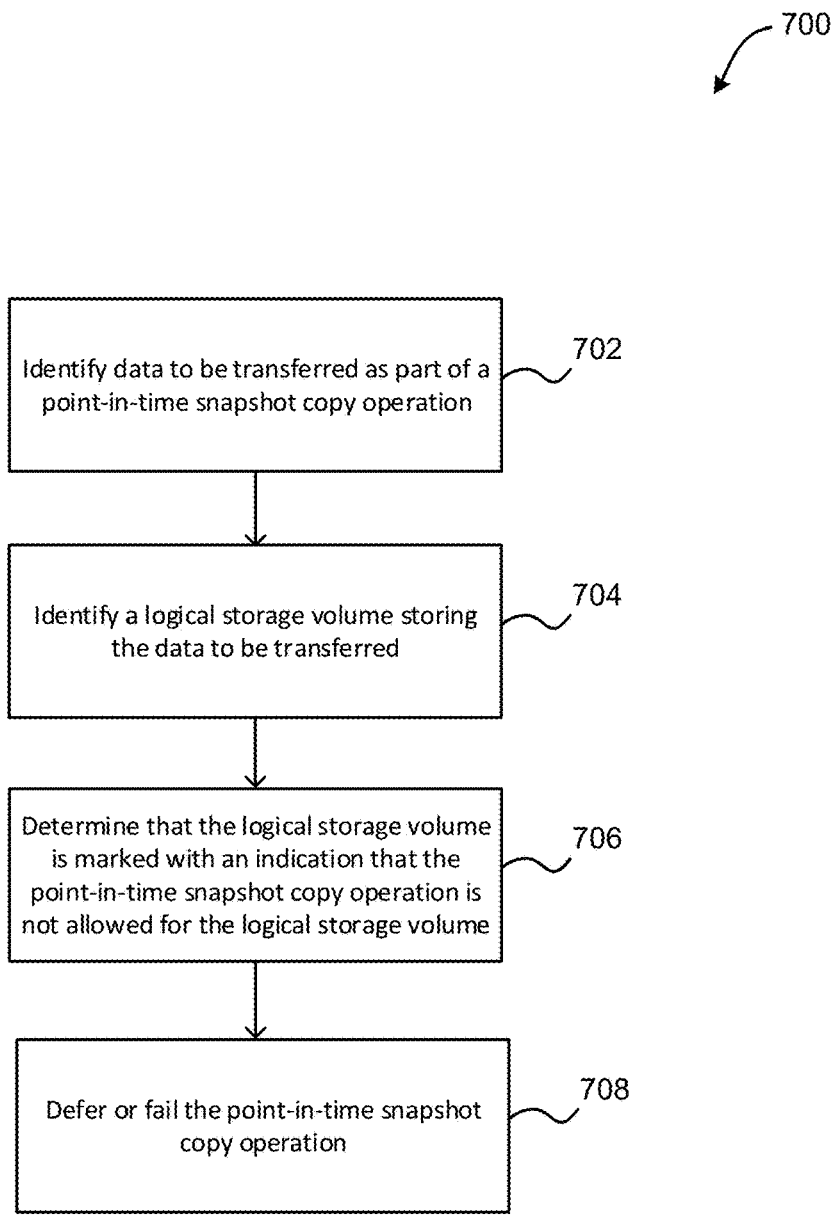
FIG. 7 illustrates a flowchart of a method for attempting to implement a point-in-time snapshot copy operation, in accordance with one embodiment of the present invention.

Now referring to FIG. 7, a flowchart of a method 700 for attempting to implement a point-in-time snapshot copy operation is shown according to one embodiment. The method 700 may be performed in accordance with the present invention in any of the environments depicted in FIGS. 1-4 and 8, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where data to be transferred as part of a point-in-time snapshot copy operation is identified. Additionally, method 700 may proceed with operation 704, where a logical storage volume storing the data to be transferred is identified. Further, method 700 may proceed with operation 706, where it is determined that the logical storage volume is marked with an indication that the point-in-time snapshot copy operation is not allowed for the logical storage volume. For example, the indication may include a flag.

Additionally, method 700 may proceed with operation 708, where the point-in-time snapshot copy operation is deferred or failed. In one embodiment, deferring the point-in-time snapshot copy operation may include rescheduling the point-in-time snapshot copy operation. In another embodiment, failing the point-in-time snapshot copy operation may include preventing the setting of a data consistency application in an idle state.

Figure 8:
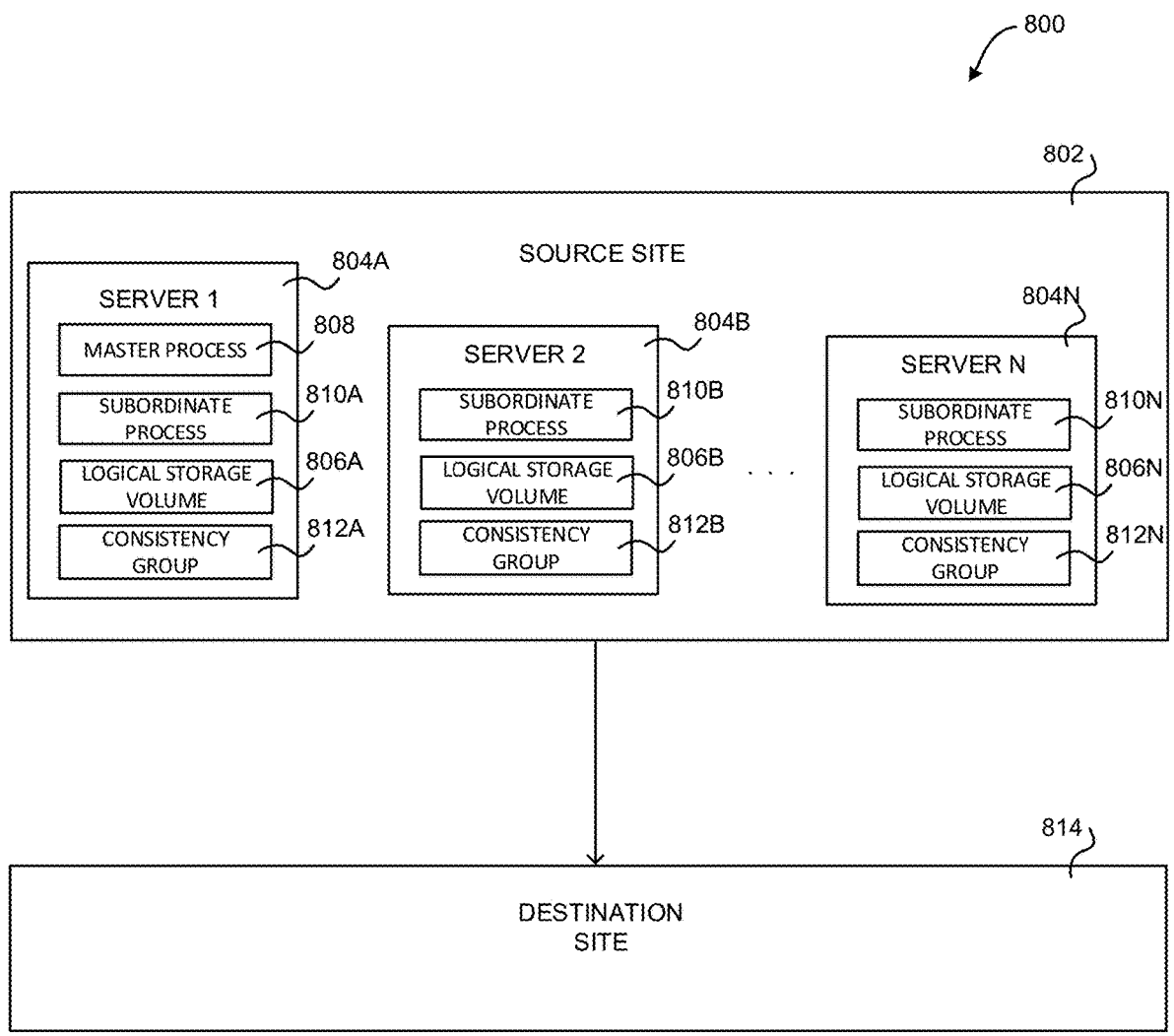
FIG. 8 illustrates an exemplary environment for throttling a point-in-time snapshot copy operation, in accordance with one embodiment of the present invention.

FIG. 8 illustrates an exemplary environment 800 for throttling a point-in-time snapshot copy operation, according to one embodiment. As shown, a source site 802 includes a plurality of servers 804A-N. Each of the plurality of plurality of servers 804A-N may be a logical partition (LPAR). Each of the plurality of servers 804A-N includes one or more logical storage volumes 806A-N.

Additionally, in one embodiment, a master process 808 of a first server 804A determines that a consistency group has not been created by a data consistency application within a predetermined period of time. In response, the master process 808 sends a request to create a consistency group to a subordinate process 810A-N within each of the plurality of servers 804A-N. The request includes an indication that the creation of the consistency group is mandatory.

Additionally, in one embodiment, in response to receiving the request, each subordinate process 810A-N identifies one or more of its corresponding storage volumes 806A-N that are associated with the request to create the consistency group, and marks these identified storage volumes 806A-N with a flag to indicate that a point-in-time snapshot copy operation is not allowed for the one or more logical storage volumes.

Further, in one embodiment, each subordinate process 810A-N creates an associated consistency group 812A-N and sends the associated consistency group 812A-N from the source site 802 to a destination site 814. For example, the destination site 814 may include one or more target storage volumes that receive and store the data within each of the consistency groups 812A-N as part of a replication operation.

Flash Copy Throttling within Global Mirror

Flash copy is used by processes to quickly move data within a system using internal resources. Once flash copy is allowed onto a global mirror (with no software changes) in a system where consistency groups are failed during the establish process it would be advantageous to have a system that protects the global mirror recovery point objective (RPO) times. In particular, a steady stream of small data set level flash copies may affect RPO even though there is not much data to send in the consistency groups.

In one embodiment, a master-controlled throttling mechanism may be used, where there are periods during consistency group (CG) formation where flash copy establishes are not allowed and instead host writes must occur.

In another embodiment, if the global mirror hasn't formed a consistency group within a tunable parameter (e.g., a max CG time, etc.), on the next start increment, a new flag may be set indicating that a consistency group is to be forced. Each subordinate may detect the force flag being set during a start Increment.

If the force flag is set, a session level flag may be set on each LPAR in the session. If one or more volumes are suspended, the consistency group may be failed; otherwise it may be allowed to form.

Additionally, a flash copy establish may be implemented. For example, before issuing a flash copy establish command onto the global mirror, software may perform a "capability query." If the flash copy is not allowed due to the forced consistency group flag being set, then software will perform a host write for data set. If the flash copy is issued, it will be rejected with an indication to try again later.

Further, in one embodiment, a global mirror master may ignore a drain timer during the creation of the "forced" consistency group, and may allow the consistency group to form. Upon successfully creating the consistency group, the master may send a reset "force consistency group" flag (e.g., on an increment complete command, on a global mirror fatal command, on a global mirror terminate command, etc.). If the consistency group is not successfully created, the master may not issue a command to reset the force flag, though certain failures or time limits could be implemented to allow resets.

Upon determining that an increment is complete, the subordinate may detect the "reset force consistency group" flag and may reset the session level flag on each LPAR in the session (which may indicate that a flash copy operation is again allowed). A tunable parameter may also exist to indicate when flash copy is allowed based on how far along the global mirror is with the creation of the current consistency group. For example, if the data is drained and the global mirror is in the flash copy state, then an indication to attempt a command at a later time (e.g., a predetermined number of seconds, etc.) may be returned.

In another embodiment, if the global mirror has drained a predetermined percentage of the current consistency group, then flash copy may not be allowed. One default may be for flash copy to always be allowed unless a force flag is set, but users may adjust this parameter to allow the global mirror to have better RPO.

In one embodiment, a method for providing a point-in-time copy process in a remote copy process having consistency groups is provided, where the processes originate at a Master and having at least one Subordinate. The method includes detecting formation and completion of consistency groups, and detecting lack of formation of a consistency group within a predetermined "Max CG" time, determining by the Master, subsequent to the detected "Max CG" time having been exceeded, whether to throttle point-in-time copy processing, and sending the decision to all Subordinates.

In one embodiment, the Master, having determined to throttle point-in-time processing, rejects point-in-time copy processing, sets a "Force CG" flag detectable by each Subordinate, and allows a consistency group to form. In another embodiment, each Subordinate, in response to the "Force CG" flag, sets session level flag for the current session which indicates that point-in time processing is not allowed. In yet another embodiment, the Master determines the status of allowed consistency groups, and determines whether to allow point-in-time processing.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by a master process, that a consistency group has not been created by a data consistency application within a predetermined period of time;
   sending, by the master process to a subordinate process, a request to create the consistency group, where the request includes an indication that a creation of the consistency group is mandatory;
   identifying, by the subordinate process, one or more logical storage volumes associated with the request to create the consistency group;
   marking, by the subordinate process, each of the identified one or more logical storage volumes to indicate that a point-in-time snapshot copy operation is not allowed for the one or more logical storage volumes;
   creating, by the subordinate process, the consistency group;
   sending, by the subordinate process, the consistency group from a source site to a destination site; and
   removing, by the subordinate process, the marking from each of the identified one or more logical storage volumes to indicate that a point-in-time snapshot copy operation is allowed for the one or more logical storage volumes.

2. The computer-implemented method of claim 1, wherein the data consistency application maintains data consistency during asynchronous data replication from the source site to a destination site.

3. The computer-implemented method of claim 1, wherein the consistency group includes a group of data to be sent during data replication from a source site to a destination site.

4. The computer-implemented method of claim 1, wherein the master process coordinates a creation of consistency groups within a first site.

5. The computer-implemented method of claim 1, wherein the master process:
   starts a timer after a consistency group has been created and sent from a first site, and
   compares a current elapsed time indicated by the timer to the predetermined period of time, and
   determines that the consistency group has not been created by the data consistency application within the predetermined period of time in response to determining that the current elapsed time exceeds the predetermined period of time.

6. The computer-implemented method of claim 1, wherein the request to create the consistency group is sent by the master process in response to determining that the consistency group has not been created by the data consistency application within the predetermined period of time.

7. The computer-implemented method of claim 1, wherein the subordinate process controls one or more logical storage volumes that contain data within the consistency group.

8. The computer-implemented method of claim 1, wherein the request to create the consistency group is sent by the master process to a plurality of subordinate processes running on a plurality of servers within a first site.

9. The computer-implemented method of claim 1, wherein the indication that the creation of the consistency group is mandatory includes a flag that is set within the request.

10. The computer-implemented method of claim 1, wherein the request includes a start increment command used to create the consistency group within servers of a first site.

11. The computer-implemented method of claim 1, wherein each of the identified one or more logical storage volumes are marked by the subordinate process setting a flag for the logical storage volume, where the flag indicates that the point-in-time snapshot copy operation is not currently allowed for the logical storage volume.

12. The computer-implemented method of claim 1, wherein the marking is removed from the identified one or more logical storage volumes in response to a completion of a transfer of the consistency group from a source site to a destination site.

13. A computer program product for throttling a point-in-time snapshot copy operation within a data consistency application, the computer program product comprising a computer readable storage medium having program instructions embodied therewith, wherein the computer readable storage medium is not a transitory signal per se, the program instructions executable by a processor to cause the processor to perform a method comprising:

determining, by a master process utilizing the processor, that a consistency group has not been created by a data consistency application within a predetermined period of time;

sending, by the master process to a subordinate process utilizing the processor, a request to create the consistency group, where the request includes an indication that a creation of the consistency group is mandatory;

identifying, by the subordinate process utilizing the processor, one or more logical storage volumes associated with the request to create the consistency group;

marking, by the subordinate process utilizing the processor, each of the identified one or more logical storage volumes to indicate that a point-in-time snapshot copy operation is not allowed for the one or more logical storage volumes;

creating, by the subordinate process utilizing the processor, the consistency group;

sending, by the subordinate process utilizing the processor, the consistency group from a source site to a destination site; and removing, by the subordinate process utilizing the processor, the marking from each of the identified one or more logical storage volumes to indicate that a point-in-time snapshot copy operation is allowed for the one or more logical storage volumes.

14. The computer program product of claim 13, wherein the data consistency application maintains data consistency during asynchronous data replication from a source site to a destination site.

15. The computer program product of claim 13, wherein the consistency group includes a group of data to be sent during data replication from a source site to a destination site.

16. The computer program product of claim 13, wherein the master process coordinates a creation of consistency groups within a first site.

17. The computer program product of claim 13, wherein the master process:

starts a timer after a consistency group has been created and sent from a first site, and compares a current elapsed time indicated by the timer to the predetermined period of time, and determines that the consistency group has not been created by the data consistency application within the predetermined period of time in response to determining that the current elapsed time exceeds the predetermined period of time.

18. The computer program product of claim 13, wherein the request to create the consistency group is sent by the master process in response to determining that the consistency group has not been created by the data consistency application within the predetermined period of time.

19. The computer program product of claim 13, wherein the subordinate process controls one or more logical storage volumes that contain data within the consistency group.

20. A system, comprising:

a processor; and logic integrated with the processor, executable by the processor, or integrated with and executable by the processor, the logic being configured to:

determine, by a master process, that a consistency group has not been created by a data consistency application within a predetermined period of time;

send, by the master process to a subordinate process, a request to create the consistency group, where the request includes an indication that a creation of the consistency group is mandatory;

identify, by the subordinate process, one or more logical storage volumes associated with the request to create the consistency group;

mark, by the subordinate process, each of the identified one or more logical storage volumes to indicate that a point-in-time snapshot copy operation is not allowed for the one or more logical storage volumes;

create, by the subordinate process, the consistency group;

send, by the subordinate process, the consistency group from a source site to a destination site; and remove, by the subordinate process, the marking from each of the identified one or more logical storage volumes to indicate that a point-in-time snapshot copy operation is allowed for the one or more logical storage volumes.

\* \* \* \* \*